United States Patent Office 3,577,275
Patented May 4, 1971

3,577,275
SEMI-CONDUCTOR CRYSTAL SUPPORTS

John C. Kosco, St. Marys, Pa., assignor to Stackpole Carbon Company, St. Marys, Pa.

No Drawing. Continuation-in-part of application Ser. No. 569,575, Aug. 2, 1966. This application Apr. 2, 1969, Ser. No. 812,854
Int. Cl. C23c *13/08*
U.S. Cl. 117—213 5 Claims

ABSTRACT OF THE DISCLOSURE

Semi-conductor crystal supports comprising a base of the group consisting of tungsten and molybdenum are prepared by oxidizing at least the surface of the base to which a current lead is to be soldered, coating at least that surface of the base with a metal of the group consisting of silver and copper, and then subjecting the coated base to hydrogen or other reducing atmosphere at a temperature above the melting point of the coating metal. Preferably the density of the base is at least 93 percent of theoretical.

This application is a continuation-in-part of my copending application trial No. 569,575, filed Aug. 2, 1966 and now abandoned.

In the production of high power semi-conductor devices it is often necessary to provide a combined mechanical support and heat sink for the very thin fragile silicon or germanium wafer. Tungsten and molybdenum materials are most frequently used for this purpose because of their strength, favorable coefficient of expansion relative to silicon, and good electrical and thermal conductivity. Such supports pose the problem of supplying current leads, and the one between the tungsten or molybdenum support and the copper lead presents formidable problems.

In present-day practice joining the tungsten or molybdenum to leads involves etching, nickel plating or nickel vapor deposition to provide a solderable surface, and finally soldering with a gold-base alloy. These methods are expensive and they result in a sharp boundary between the lower coefficient of expansion of the support and copper, which has a much higher expansion coefficient. The consequence of the wide difference in thermal expansion coefficients is that thermal stresses are large in the joint so that thermal fatigue and bimetal effects result.

It is among the objects of this invention to provide a method of making molybdenum and tungsten semi-conductor crystal supports provided on one surface with a layer, or coating, of copper or silver to which current-carrying leads may be connected by ordinary soldering practices, without further processing, and which in contrast to the practices alluded to above exhibit a transition zone instead of the sharp boundary between the tungsten or molybdenum support and the coating layer referred to above, which is simple, effective, easily performed with readily available equipment, and which obviates the nickel plating and gold soldering referred to above.

Most manufacturers of high power semi-conductor devices prefer that the supports be made of pure tungsten or pure molybdenum to minimize diffusion into the silicon or other semi-conductor crystal that may be encountered if these support metals contain substantial amounts of alloying elements. It is preferred likewise that the tungsten and molybdenum be of at least 93 percent of theoretical density. For some purposes, however, the support metals may contain certain additives in amounts limited so that the desired density is realized. Thus, there my be used tungsten containing from about 0.5 to 1 percent of nickel as an activator of the sintering process. Or there may be used pseudo-alloys of tungsten or molybdenum with silver or copper to increase the thermal and electrical conductivity. Because silver and copper exert an undesirable effect upon the thermal coefficient of expansion of tungsten and molybdenum, the silver content is generally less than 15 percent in the case of tungsten, and less than 25 percent in the case of molybdenum.

The supports may be cut from rods of tungsten or molybdenum, or they may be made by sintering compacts of the powdered metals under conditions productive of supports of at least 93 percent of theoretical density.

In accordance with this invention the tungsten or molybdenum support is oxidized, as by heating it in air, to form a thin and somewhat spongy oxide film on at least the surface to which the current lead is to be soldered. The oxidation can be carried out over a rather wide range of temperatures. Temperatures as low as 800° F. can be used if very long time periods are permissible. Temperatures as high as 1800° F. yield a satisfactory oxide surface in a few minutes. In general, however, it is preferred to oxidize in air for one to two hours at about 1500° F.

During this oxidation step oxides of tungsten or molybdenum form on the surface of the support material. The tungsten oxide is greenish-yellow in color, and it is of quite spongy nature. When subjected to hydrogen or equivalent reducing atmosphere, at temperatures of the order of at least about 1000° F., the oxide formed is reduced to the metal, and the reduced metal is very clean and is thus readily wettable by both silver and copper.

In accordance with the invention, silver or copper, as a coating metal, in the form of powder, foil or sheet is placed upon the oxidized surface and the support is then passed through an oven in hydrogen or other reducing atmosphere at a temperature above the melting point of the copper or the silver, as the case may be. The oxide film is reduced to metal and the copper or silver becomes impregnated into the spongy metal resulting from the oxide reduction. That is, the coating metal infiltrates the void space in the spongy skeleton produced by reduction of the oxide with formation of a transition W-Cu or W-Ag layer between the outer copper or silver layer and the underlying tungsten or molybdenum. Enough copper or silver is used so that at the end of the reduction a pure copper or silver layer is developed on the surface to which it was applied.

As an example of the practice of the invention, there was provided a pure tungsten support disc containing less than 0.5 percent of impurity and having a density in excess of 93 percent of theoretical. The disc was 0.625 inch diameter and 0.050 inch thick. It was heated one hour at 1500° F. in air to produce an oxide layer approximately 0.001 inch thick. A piece of copper sheet was placed on the oxidized surface and the assembly was then fired in hydrogen at 1150° C. for three minutes during which time the oxide surface was reduced and infiltrated with copper to yield a support in accordance with this invention. The resulting disc was finished to size by grinding and lapping so that the final tungsten thickness was 0.045 inch, the transition zone was 0.001 inch, and the pure copper layer was 0.005 inch thick. A lead may be soldered to the copper with ordinary Pb-Sn solder or with silver solder.

Although reference has been made largely to silicon it will be understood by those familiar with the art that the bases provided by the invention are suited to association with germanium and other semi-conductor crystals.

According to the provisions of the patent statutes, I have explained the principle of my invention and have described what I now consider to represent its best embodiment. However, I desire to have it understood that, within the scope of the appended claims, the invention may be practiced otherwise than as specifically described.

I claim:

1. That method of making a semi-conductor crystal support comprising providing a base of a metal of the group consisting of tungsten and molybdenum, oxidizing a surface of said base, applying to the oxidized surface a metal of the group consisting of copper and silver, and then heating in a reducing atmosphere to a temperature above the melting point of said coating metal.

2. A method according to claim 1, said atmosphere being hydrogen.

3. A method according to claim 1, said surface being oxidized by heating to at least about 800° F., in air.

4. A method according to claim 3, said reducing atmosphere being hydrogen.

5. A method according to claim 1, said base being tungsten and said coating metal being copper.

References Cited

UNITED STATES PATENTS 3,259,558 7/1966 Hagiwera et al.

WILLIAM L. JARVIS, Primary Examiner

U.S. Cl. X.R.

29—578; 117—215, 217, 212; 148—6.3